Feb. 26, 1929.
F. W. WAGNER
ATTACHMENT FOR TREADS FOR AUTO CHAINS
Filed March 23, 1927
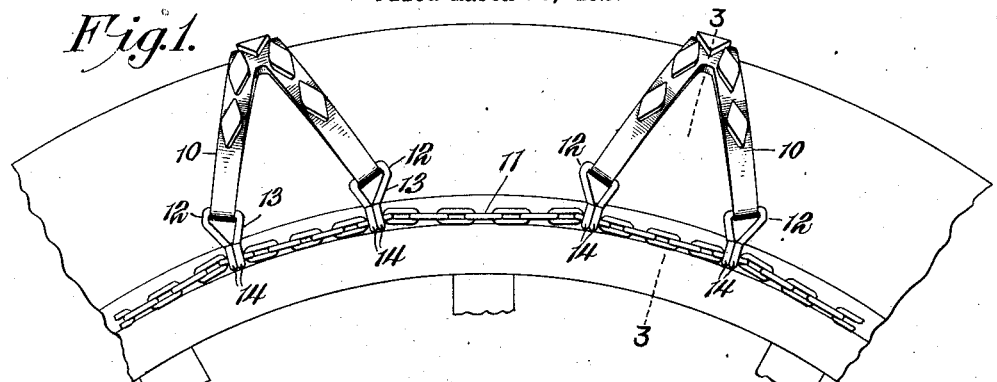
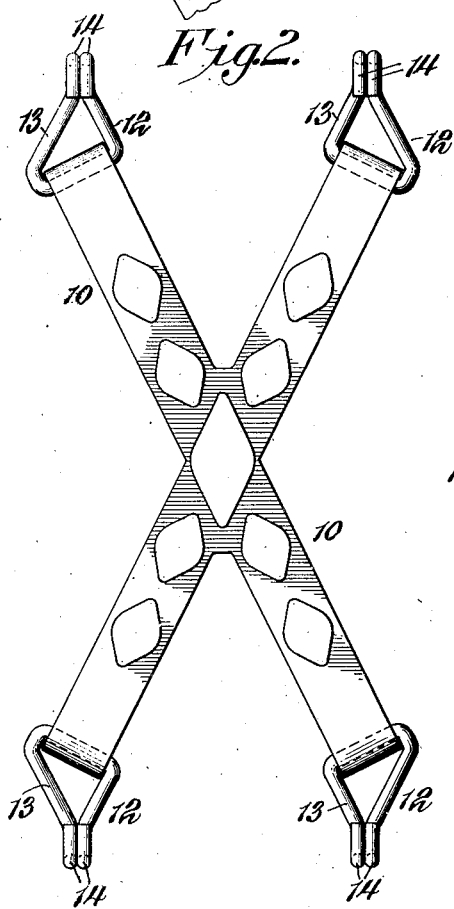
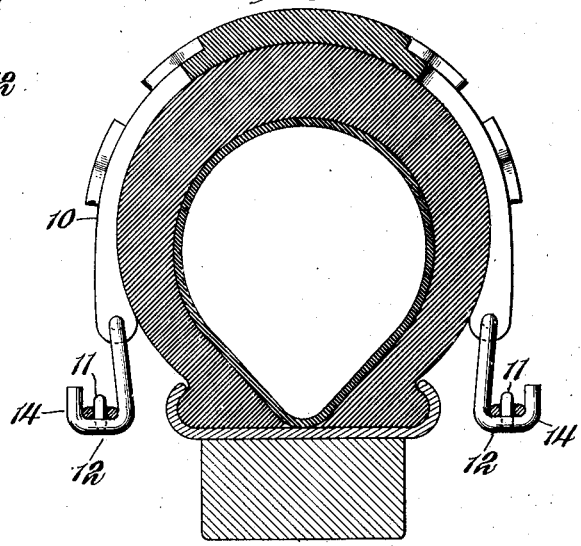
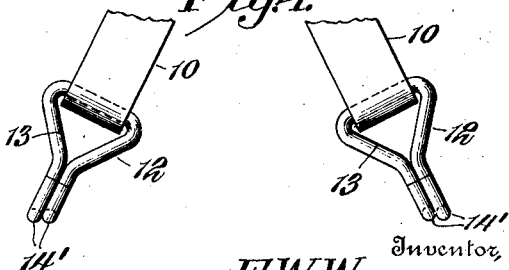
Inventor,
F. W. Wagner Patented Feb. 26, 1929.

1,703,255

UNITED STATES PATENT OFFICE.

FRED W. WAGNER, OF BRADFORD, PENNSYLVANIA.

ATTACHMENT FOR TREADS FOR AUTO CHAINS.

Application filed March 23, 1927. Serial No. 177,658.

My invention aims to provide an improved hook fastener for attaching X-shaped fabric or rubber treads to side chains and one of the objects is to produce a fastener having two hooked ends so shaped and arranged as to distribute the load or strain and the wear evenly on both of the hooks.

Other objects and advantages of my invention will appear in the specification when considered in connection with the illustrative embodiments thereof shown in the accompanying drawing, wherein Fig. 1 is a fragmentary elevation showing one form of my improved fasteners applied to an anti-skid chain, Fig. 2 is a top plan view of one of the cross chain members shown in Fig. 1, Fig. 3 is a cross sectional view taken on the line 3—3 in Fig. 1; and Fig. 4 is a fragmentary view showing a slightly modified form of fastener.

Referring particularly to the drawings, (Figs. 1, 2 and 3), I have shown the preferred form of my fasteners applied to cross treads or straps 10 which are usually made of fabric or reenforced rubber and are substantially X-shaped (Fig. 2). Such cross treads are usually connected to the side chains 11 by hook-shaped fasteners having their hooked ends of the same length so that the strain and wear is carried by only one of the hooks until it is practically worn out.

I secure the branches of the cross treads to the side chains by means of fasteners 12 which are formed of a single piece of wire presenting a loop portion 13 and double hooked ends 14, one longer than the other, so that each hook will engage a link of the side chain and take a part of the strain and wear. Moreover, the bottoms of the hooks are preferably wide enough to receive a whole link of the side chain (see Fig. 3) and the hooks are adapted to be applied to it from the inside.

In that form of fastener shown in Figs. 1, 2 and 3, one arm lies parallel with the axis or the edge of the branch to which it is connected to take the tension directly and the opposite arm is bent at an angle to the axis of the branch and is longer than the first arm so that the hooked portions on the two branches at one side of the chain all lie in substantially the same plane, and the tension is applied at right angles to the side chains. The short, straight arms are preferably arranged on the inner edges of the branches of the cross chains to insure a more even distribution of the strain.

In the modification shown in Fig. 4, the loop arms are symmetrical and the hooks 14' are arranged axially of the branches of the cross chain but the bottoms of the hooks still lie in the same plane as previously described.

With my improved fasteners the strain and wear are equalized and one hook portion does not wear out before the other. Further, the tension is transmitted throughout the widths of the branches of the cross treads or straps 10 so that it does not rip out at one edge where it is secured to the fasteners.

Having thus described two selected embodiments of my invention with the understanding that it is not limited thereto, what I claim and desire to secure by Letters Patent is:

1. In an anti-skid chain having X-shaped cross straps, fasteners for securing the branches of the straps to the side chains, said fasteners each comprising a piece of wire bent to provide adjacent, double hooked ends and having arms of different lengths whereby both hooks engage a link of the side chain at substantially right angles thereto and share the strain and wear.

2. In an anti-skid chain having cross chains in the form of X-shaped strap members, fasteners therefor each having double hooks adapted to straddle a link of the side chain, one of said double hooks being longer than the other whereby the strain and wear are distributed to both hooks.

3. A fastener for securing a strap at an angle to a chain comprising a single piece of wire bent to form a loop into which the strap is secured and a pair of hooked ends, one of said hooked ends having a straight arm substantially parallel with the axis of the strap, the other hooked end lying adjacent thereto and having a longer arm than the first named arm and lying at an angle across the axis of the strap whereby to distribute tension strain on the hooked ends.

4. In an anti-skid device, a fastener for securing a strap at an angle to the side chain, comprising a single piece of wire bent to form a cross bar adapted to be imbedded transversely in the strap and a pair of adjacent, open, hooked ends adapted to straddle both runs of a link of the side chain at substantially right angles thereto; one of said hooked ends having a straight arm substantially parallel with the axis of the strap; and the other hooked end having a longer arm than the first named arm and lying at an angle across the axis of the strap, whereby both hooks share the strain and wear.

5. A device of the class described composed of a section of material formed into an eye between its ends, the parts being brought into contact beyond the eye to form a straight shank and bent into a hook beyond the shank, one of the contacting shank parts being longer than the other, so that one side of the hook is offset from the other in the direction of the length of the shank to give the hook parts a potential bearing in lines forming oblique angles with said direction.

In testimony, that I claim the foregoing as my own, I have hereto affixed my signature.

FRED W. WAGNER.